US009454656B2

(12) United States Patent
Oberheide et al.

(10) Patent No.: US 9,454,656 B2
(45) Date of Patent: *Sep. 27, 2016

(54) SYSTEM AND METHOD FOR VERIFYING STATUS OF AN AUTHENTICATION DEVICE THROUGH A BIOMETRIC PROFILE

(71) Applicant: Duo Security, Inc., Ann Arbor, MI (US)

(72) Inventors: Jon Oberheide, Ann Arbor, MI (US); Douglas Song, Ann Arbor, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,786

(22) Filed: May 4, 2015

(65) Prior Publication Data

US 2015/0235017 A1  Aug. 20, 2015

Related U.S. Application Data

(63) Continuation of application No. 14/455,640, filed on Aug. 8, 2014, now Pat. No. 9,053,310.

(60) Provisional application No. 61/863,837, filed on Aug. 8, 2013.

(51) Int. Cl.
*H04L 29/06* (2006.01)
*G06F 21/32* (2013.01)
*G06F 21/45* (2013.01)
*G06F 21/34* (2013.01)

(52) U.S. Cl.
CPC ............... *G06F 21/32* (2013.01); *G06F 21/34* (2013.01); *G06F 21/45* (2013.01)

(58) Field of Classification Search
CPC ......... G06F 21/32; G06F 21/34; G06F 21/45

USPC .............................................................. 726/6
See application file for complete search history.

(56) References Cited

U.S. PATENT DOCUMENTS

| 5,838,792 | A   |   | 11/1998 | Ganesan                      |
|-----------|-----|---|---------|------------------------------|
| 5,870,723 | A   | * | 2/1999  | Pare, Jr. ............ G06F 21/32 |
|           |     |   |         | 705/39                       |
| 6,119,096 | A   | * | 9/2000  | Mann ................. E05G 5/003 |
|           |     |   |         | 235/384                      |
| 6,209,091 | B1  |   | 3/2001  | Sudia et al.                 |
| 6,694,025 | B1  |   | 2/2004  | Epstein et al.               |
| 6,758,394 | B2  | * | 7/2004  | Maskatiya ........... G06Q 20/18 |
|           |     |   |         | 235/379                      |
| 6,823,359 | B1  |   | 11/2004 | Heidingsfeld et al.          |
| 6,934,858 | B2  |   | 8/2005  | Woodhill                     |
| 6,956,950 | B2  |   | 10/2005 | Kausik                       |

(Continued)

OTHER PUBLICATIONS

Simske et al., "APEX: Automated Policy Enforcement eXchange", Sep. 21-24, 2010, ACM, pp. 139-142.

(Continued)

*Primary Examiner* — Michael S McNally
(74) *Attorney, Agent, or Firm* — Jeffrey Schox; Thomas Gwinn

(57) ABSTRACT

A system and method that includes receiving a first biometric profile and associating the first biometric profile with a first application instance that is assigned as an authentication device of a first account; receiving a second biometric profile for a second application instance, wherein the second application instance is making a request on behalf of the first account; comparing the second biometric profile to the first biometric profile; and completing the request of the second application instance according to results of comparing the second biometric profile to the first biometric profile.

17 Claims, 14 Drawing Sheets

(56) References Cited

U.S. PATENT DOCUMENTS

| | | | |
|---|---|---|---|
| 7,096,354 B2 | 8/2006 | Wheeler et al. | |
| 7,331,518 B2 | 2/2008 | Rable | |
| 7,447,784 B2 | 11/2008 | Eun | |
| 7,463,637 B2 | 12/2008 | Bou-Diab et al. | |
| 7,526,792 B2 | 4/2009 | Ross | |
| 7,562,382 B2 | 7/2009 | Hinton et al. | |
| 7,574,733 B2 | 8/2009 | Woodhill | |
| 7,711,122 B2 | 5/2010 | Allen et al. | |
| 7,953,979 B2 | 5/2011 | Borneman et al. | |
| 7,982,595 B2 | 7/2011 | Hanna et al. | |
| 8,028,329 B2 | 9/2011 | Whitcomb | |
| 8,136,148 B1 | 3/2012 | Chayanam et al. | |
| 8,161,527 B2 | 4/2012 | Curren | |
| 8,200,980 B1* | 6/2012 | Robinson | G06Q 20/04 713/186 |
| 8,245,044 B2 | 8/2012 | Kang | |
| 8,332,627 B1 | 12/2012 | Matthews et al. | |
| 8,335,933 B2 | 12/2012 | Humphrey et al. | |
| 8,397,301 B2 | 3/2013 | Hering et al. | |
| 8,402,526 B2 | 3/2013 | Ahn | |
| 8,458,798 B2 | 6/2013 | Williams et al. | |
| 8,495,720 B2 | 7/2013 | Counterman | |
| 8,499,339 B2 | 7/2013 | Chao et al. | |
| 8,538,028 B2 | 9/2013 | Yeap et al. | |
| 8,627,438 B1 | 1/2014 | Bhimanaik | |
| 8,646,086 B2 | 2/2014 | Chakra et al. | |
| 8,689,287 B2 | 4/2014 | Bohmer et al. | |
| 8,700,729 B2 | 4/2014 | Dua | |
| 8,732,475 B2 | 5/2014 | Fahrny et al. | |
| 8,732,839 B2 | 5/2014 | Hohl | |
| 8,763,077 B2 | 6/2014 | Oberheide et al. | |
| 8,806,609 B2 | 8/2014 | Gladstone et al. | |
| 2,639,997 A1 | 9/2014 | Wiesmaier et al. | |
| 8,850,516 B1 | 9/2014 | Hrebicek et al. | |
| 8,893,230 B2 | 11/2014 | Oberheide et al. | |
| 8,898,762 B2 | 11/2014 | Kang | |
| 2002/0123967 A1 | 9/2002 | Wang | |
| 2003/0115452 A1 | 6/2003 | Sandhu et al. | |
| 2003/0126472 A1 | 7/2003 | Banzhof | |
| 2003/0147536 A1 | 8/2003 | Andivahis et al. | |
| 2004/0064706 A1 | 4/2004 | Lin et al. | |
| 2005/0218215 A1* | 10/2005 | Lauden | G07C 9/00087 235/380 |
| 2005/0221268 A1* | 10/2005 | Chaar | G09B 7/02 434/350 |
| 2005/0268107 A1 | 12/2005 | Harris et al. | |
| 2006/0130139 A1 | 6/2006 | Sobel et al. | |
| 2006/0165060 A1 | 7/2006 | Dua | |
| 2006/0182276 A1 | 8/2006 | Sandhu et al. | |
| 2006/0242692 A1 | 10/2006 | Thione et al. | |
| 2007/0199060 A1 | 8/2007 | Touboul | |
| 2007/0228148 A1 | 10/2007 | Rable | |
| 2007/0250914 A1 | 10/2007 | Fazal | |
| 2007/0284429 A1 | 12/2007 | Beeman | |
| 2008/0049642 A1 | 2/2008 | Gudipudi et al. | |
| 2008/0120411 A1 | 5/2008 | Eberle | |
| 2009/0055906 A1 | 2/2009 | Wendorff | |
| 2009/0187986 A1 | 7/2009 | Ozeki | |
| 2009/0300596 A1 | 12/2009 | Tyhurst et al. | |
| 2009/0300707 A1 | 12/2009 | Garimella et al. | |
| 2010/0042954 A1 | 2/2010 | Rosenblatt et al. | |
| 2010/0069104 A1 | 3/2010 | Neil et al. | |
| 2010/0114740 A1 | 5/2010 | Dominguez et al. | |
| 2010/0115578 A1 | 5/2010 | Nice et al. | |
| 2010/0121767 A1 | 5/2010 | Coulter et al. | |
| 2010/0125737 A1 | 5/2010 | Kang | |
| 2010/0180001 A1 | 7/2010 | Hardt | |
| 2010/0202609 A1 | 8/2010 | Sandhu et al. | |
| 2010/0216425 A1 | 8/2010 | Smith | |
| 2010/0217986 A1 | 8/2010 | Schneider | |
| 2010/0233996 A1 | 9/2010 | Herz et al. | |
| 2010/0330969 A1 | 12/2010 | Kim et al. | |
| 2011/0026716 A1 | 2/2011 | Tang et al. | |
| 2011/0086616 A1 | 4/2011 | Brand et al. | |
| 2011/0107389 A1 | 5/2011 | Chakarapani | |
| 2011/0138469 A1 | 6/2011 | Ye et al. | |
| 2011/0197267 A1 | 8/2011 | Gravel et al. | |
| 2011/0219449 A1 | 9/2011 | St. Neitzel et al. | |
| 2011/0277025 A1 | 11/2011 | Counterman | |
| 2011/0302410 A1 | 12/2011 | Clarke et al. | |
| 2011/0302630 A1 | 12/2011 | Nair et al. | |
| 2012/0090028 A1 | 4/2012 | Lapsley et al. | |
| 2012/0096274 A1 | 4/2012 | Campagna et al. | |
| 2012/0198050 A1 | 8/2012 | Maki et al. | |
| 2012/0216239 A1 | 8/2012 | Yadav et al. | |
| 2012/0227098 A1 | 9/2012 | Obasanjo et al. | |
| 2012/0300931 A1 | 11/2012 | Ollikainen et al. | |
| 2013/0042002 A1 | 2/2013 | Cheeniyil et al. | |
| 2013/0081101 A1 | 3/2013 | Baer et al. | |
| 2013/0097585 A1 | 4/2013 | Jentsch et al. | |
| 2013/0110676 A1 | 5/2013 | Kobres | |
| 2013/0125226 A1 | 5/2013 | Shah et al. | |
| 2013/0174246 A1 | 7/2013 | Schrecker et al. | |
| 2013/0179681 A1 | 7/2013 | Benson et al. | |
| 2013/0326493 A1 | 12/2013 | Poonamalli et al. | |
| 2014/0047546 A1 | 2/2014 | Sidagni | |
| 2014/0188796 A1 | 7/2014 | Fushman et al. | |
| 2014/0208405 A1 | 7/2014 | Hashai | |
| 2014/0235230 A1 | 8/2014 | Raleigh | |
| 2014/0237236 A1 | 8/2014 | Kalinichenko et al. | |
| 2014/0245278 A1 | 8/2014 | Zellen | |
| 2014/0351954 A1 | 11/2014 | Brownell et al. | |
| 2015/0012914 A1 | 1/2015 | Klein et al. | |

OTHER PUBLICATIONS

Symantec, Administration Guide for Symantec TM Endpoint Protection and Symantec Network Access Control, Aug. 1, 2007.

Goldfeder et al., Securing Bitcoin wallets via a new DSA/ECDSA threshold signature scheme, http://www.cs.princeton.edu/~stevenag/threshold_sigs.pdf.

* cited by examiner

SYSTEM AND METHOD FOR VERIFYING STATUS OF AN AUTHENTICATION DEVICE THROUGH A BIOMETRIC PROFILE

CROSS-REFERENCE TO RELATED APPLICATIONS

This application is a continuation of co-pending U.S. patent application Ser. No. 14/455,640, filed 8 Aug. 2014, which claims the benefit of U.S. Provisional Application Ser. No. 61/863,837, filed on 8 Aug. 2013, both of which are incorporated in their entirety by this reference.

TECHNICAL FIELD

This invention relates generally to the authentication field, and more specifically to a new and useful system and method for verifying status of an authentication device in the authentication field.

BACKGROUND

With increasing computing capabilities and more and more services moving online, security has become increasingly important. Username and password serves as a base level of authentication security, but services are now moving to two-factor authentication, token based authentication, and/or alternative forms of authentication. Using not only what a user knows as an authentication layer (e.g., a username and password), but also what the user has (e.g., two-factor authentication and token authentication), has seen increased popularity with smart phones and other mobile computing devices. Two-factor authentication, in particular, can involve a phone or device to be registered to a particular user.

Two-factor authentication can involve enrolling a device to be used as an authentication device, such as a mobile phone. In some cases, the authentication can be tied to an authentication application on that device. However, without that device, a legitimate user loses the ability to be authorized. If a phone is lost or an authorization application is uninstalled, a new authentication device may need to be re-enrolled. This process can be cumbersome and potentially a security threat. In one possible option, re-enrolling can require contacting an IT admin to change the device. However, this process cannot only be slow and inconvenient but is vulnerable to social engineering forms of exploitation. Another form of re-enrollment might be to use a pin code to re-enroll the device/application, but then this pin code becomes a vulnerability to the authentication security.

Thus, there is a need in the authentication field to create a new and useful system and method for verifying status of an authentication device. This invention provides such a new and useful system and method.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. System for Verifying Status of an Authentication Device

Figure 1:
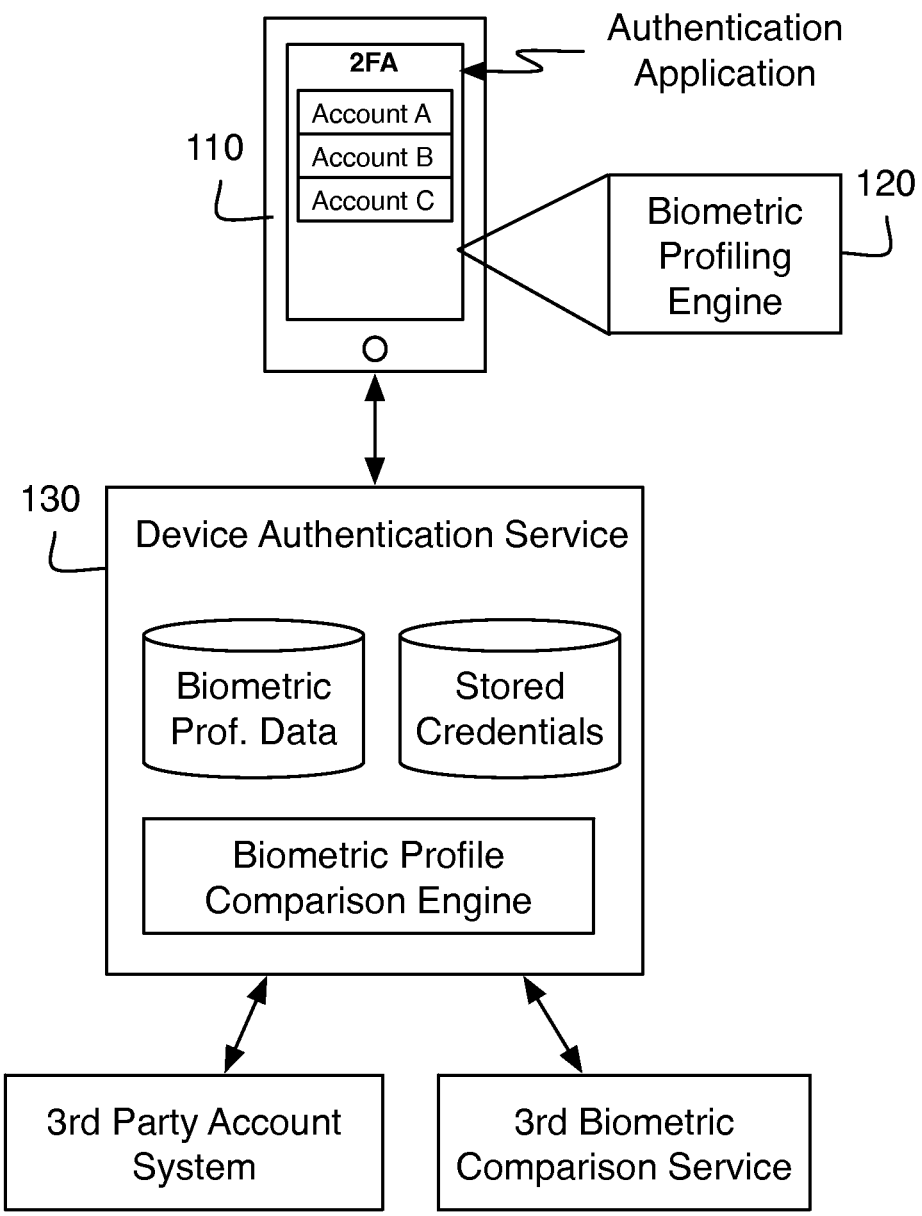
FIG. 1 is schematic representation of a system of a preferred embodiment.

As shown in FIG. 1, a system for verifying status of an authentication device of a preferred embodiment can include an authentication application 110, a biometric profiling engine 120, and a device authentication service 130. The system functions to use a biometric based profile during the authorization process. The biometric profile is preferably used when re-enrolling a device. Re-enrolling a device is frequently performed when a user loses a device, changes phone numbers, clears configuration of an application, reinstalls an application, updates an application, or somehow breaks the mechanism to link the device/application with an account. The system can similarly be used when enrolling an additional authentication application (on the same or a different device). The system preferably creates a reference biometric profile, and this is used to evaluate biometric profiles created at the time of a re-enrollment request. The biometric profile preferably acts as a signal for the mapping between a user and a particular device.

The system is preferably used in combination with a two-factor authentication (2FA) service, and more preferably a 2FA system that leverages a mobile computing device as the second factor of authentication. Herein 2FA is used as a primary example of application, but it could be readily understood that the number of factors of authentication can be greater than two (i.e., can be multi-factor authentication). The system is configured to enable improved recovery of the second form of authentication—the authentication application 110 or the device. Phones and tablets can be an ideal form of a second factor of authentication, but the 2FA can be used with any suitable computing device such as a desktop computer, a media player device for a TV, a gaming system, a wearable computer, or any suitable computing device. The devices are preferably readily available and provide an out of band channel for a user to verify an authentication attempt. A device or more specifically an authentication application 110 can be described as an authentication device instance. The authentication device instance can provide a "what you have" layer of security for authentication and/or authorization. In some variations, users register accounts to use the authentication device instance in a 2FA. When trying to login for the registered account, a push notification can be sent to the authentication device instance. In another variation, registering an account sets up one-time passwords (OTP) on the authentication device instance. The authentication device instance can enable access to the OTPs. In another variation, login codes can be transmitted to authentication device instance. The use of a biometric profile can extend this notion of "what you have" layer to be a "who you are" element of the "what you have" layer of security.

As more 2FA systems rely on mobile devices as a form of authentication, the loss of a 2FA device or application can cause many issues, which the system improves. One benefit of the system is that it can be used to ease the enrollment process of devices. This system enables a secure recovery of an authentication mechanism. The system extends the notion of "what you have" beyond simple physical addressing identification to include notions of what user uniquely uses the device.

The authentication application 110 of the preferred embodiment functions as a component enabling a device to be used as a 2FA mechanism. In a first variation, the 2FA process occurs within the application. The authentication application 110 can receive push notifications, alert a user, and receive the 2FA confirmation within the authentication application 110. The authentication application 110 is preferably associated with at least one account with 2FA. In an exemplary scenario, an account will set up a username and password and set a 2FA to be used with the account. The user will complete an enrollment process to associate the device with the account. Subsequently, when a user tries to log in with his username and password of an account on an associated service, the authentication application 110 is notified and confirmation has to be completed through the application. For example, a user attempts to login to a web service on a browser (on a different device or in a different application), that web service can initiate an authentication process that will depend on some user interaction with the authentication application 110 (e.g., entering a code obtained from the application or completing some action from within the application). In one variation, an authentication application 110 can be used with the authentication of a plurality of different accounts on different outside service.

The authentication application 110 can alternatively be associated with a single account system, and the application can have additional functionality not related to authentication. For example, a social network can use the social network app as a channel through which 2FA is invoked. When a user tries to login or perform a restricted action (e.g., authorize access to data by an outside application), the social network app can be used to facilitate completion of that process. The authentication application 110 can alternatively be associated with multiple account systems. In this variation, the authentication application 110 can be customized for use with a variety of different accounts with 2FA. The authentication application 110 will preferably include a set of credentials for the various account systems. This set of credentials can include signatures, keys, tokens, and other parameters that are used as security measures during authentication. If the device is lost or the application data is deleted, such credentials may be lost as well. The set of credentials can be backed up in the device authentication service 130.

The system and methods of preferred embodiments may alternatively not be used for two-factor authentication, but used for any use-case of credential or account recovery. For example, credentials setup for the primary authentication of an application (e.g., as in a mobile-first application) can be reestablished through the system and method. In one variation, a user may not be required to provide account username and password for an application that was previously setup. The device profiling approach of the system and method can be used to validate that the user and/or device match and that credentials can be restored.

In one variation, the authentication application 110 may not be used for completing the 2FA but is used to facilitate enrolling a device as an authentication device instance and collecting a biometric profile for reference or comparison. In this variation, the authentication application 110 is used during the enrollment process of a new device. For example, if 2FA is completed by sending pin codes over SMS to a phone number, the authentication application 110 is preferably used in establishing a reference biometric profile of a user of the phone when setting up a new phone number. Subsequent 2FA operations can be completed through SMS or other outside applications on the device. In one exemplary use case scenario, a social network may want to use 2FA over SMS. When enrolling/registering a device for use with 2FA, a corresponding social network application may explicitly or transparently collect a biometric profile. Use of the social network application can periodically update the biometric profile (which can be confirmed to be the same); changes in the biometric profile may result in invalidating use of SMS for authentication. The authentication application 110 can additionally include the biometric profiling engine 120 in part or whole.

Figure 2:
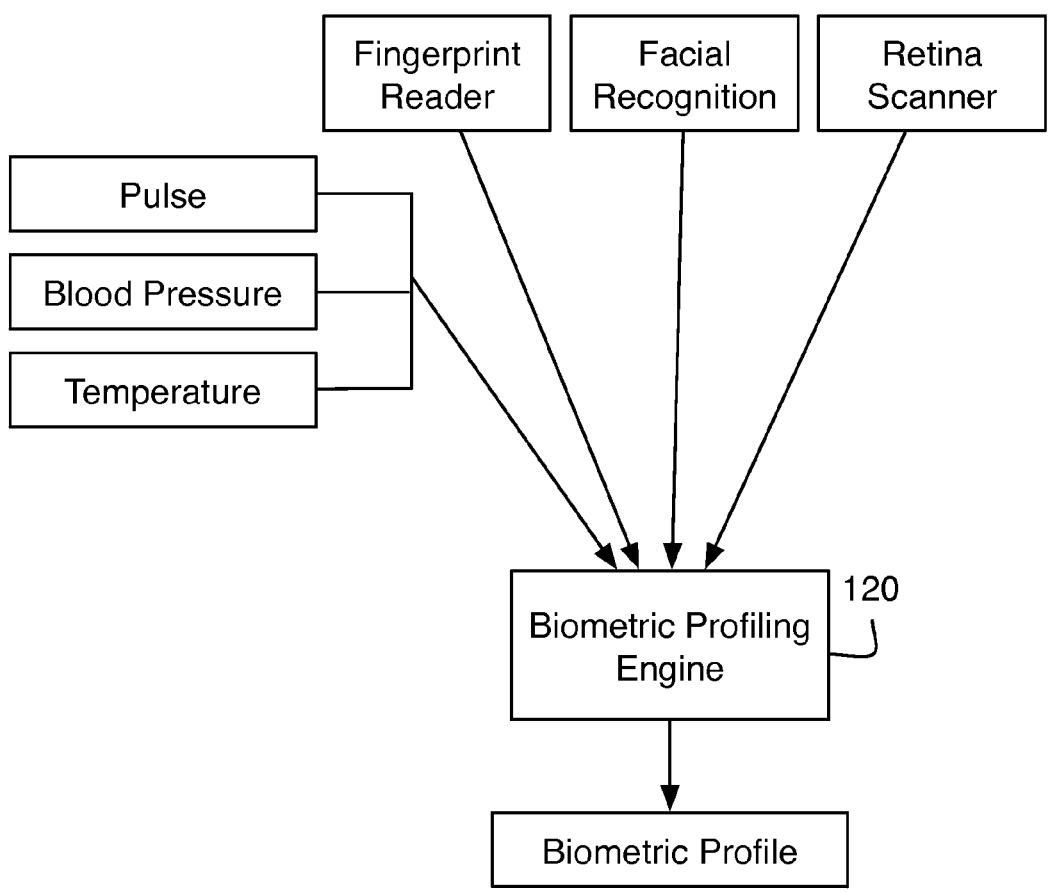
FIG. 2 is a schematic representation of a biometric profile and contributing components.

The biometric profiling engine 120 of the preferred embodiment functions to generate a biometric profile of a user. The biometric profiling engine 120 is preferably integrated with the authentication application 110. During the initial enrollment of a new authentication credential, a user can be asked to provide biometric samples or readings. The biometric samples, in some situations, can serve as the biometric profiles. The biometric samples may include collected biometric data relating to various biometric signals as shown in FIG. 2. Some exemplary biometric signals may include voice characteristics, unique body patterns (e.g., fingerprints, retina patterns, tongue prints, hair growth patterns, capillary patterns), body activities (e.g., pulse, blood pressure, body temperature), and/or any suitable metric or combination of metrics. In a preferred implementation, a user's voice characteristics are used as the biometric medium that is tied to the identity of the user. Raw audio recordings of a user reading one or more phrases can serve as the biometric profile. In other situations, the biometric samples are reduced into a set of features that define a biometric profile. The features can be defined in a digital fingerprint or signature, which may be a hash or some encoded representation of biometric samples. A biometric profile preferably does not uniquely match to other biometric profiles, but instead provides a set of characteristics or metrics that can be correlated to another biometric profile and either determined as a match or a non-match. In an alternative variations, device profiles may be defined as a digital fingerprint or signature that uniquely correspond to identical device profiles.

The biometric profiling engine 120 may be integrated into any suitable component of the 2FA system. The biometric profiling engine 120 may reside entirely within the remote device authentication service with the biometric samples collected via a website or channel other than the authentication device. For example, a user may initiate 2FA enrollment on a website. Before or after providing details of the authentication device, the user may be asked to record some audio or supply other suitable biometric information to complete enrollment. In some variations, an initial biometric profile can be created from existing media, and completed transparently from the user. For example, a social network may use photos of the primary user shared on the social network to create a biometric profile. A biometric profile generated by the biometric profiling engine 120 is preferably a data object with structured readable/raw data and/or cryptographic/processed representation of one or more biometric signals.

The biometric samples can be speech samples, fingerprints, facial recognition, retina/eye recognition pulse/capillary/blood pressure pattern recognition, patterns in breath, and/or any suitable form of a biometric reading. In a first variation, the biometric sample is speech based. A phrase or multiple phrases are displayed to the user, and the recording is generated of the user reading provided phrases aloud. In subsequent biometric readings, the user can read different phrases. The process of comparing the biometric profiles can preferably compare the voice characteristics of different recorded phrases. The generated phrases preferably correspond to phrases that have predictable voice characteristics based on the reference biometric sample/signature. The changing phrases can complicate the process of an attacker using a playback attack approach. In another variation, a speech sample can embed knowledge-based information such that a biometric profile is overloaded with at least two factors of authentication—"who you are" and "what you know". For example, a user may be required to say a pass phrase. The pass phrase can be extracted using speech-to-text recognition, and then the speaker extracted using a form of speaker recognition.

In a second variation, the biometric sample is a fingerprint reading. The fingerprint reading can be read from a fingerprint scanner of the device or a camera. Other suitable forms of biometric scanners can alternatively be used, such as palm scanners, retina scanners, iris scanners, tongue scanner, hair growth patterns (e.g., on the arm), capillary patterns (e.g., measured by illuminating the skin in contact with a camera), and the like. In another variation, the biometric sample is based on facial recognition of an image. A camera on a device can be accessed and used to take a picture of the user.

The biometric profiling engine 120 can additionally collect a set of different measurements, wherein the biometric profile is the combination of multiple measurements. For example, pulse, blood pressure, and body temperature may not individually be unique, but in combination with the time of day may provide a substantially identifying metric. The biometric profiling engine 120 may use sensors on the device but may alternatively or additionally use sensors or input devices as sources of biometric data.

The device authentication service 130 of the preferred embodiment functions as a remote service that can be communicatively coupled to the authentication application 110. The device authentication service 130 is preferably remote or distinct from the device where the authentication application 110 is installed. The device authentication service 130 is preferably a central system that facilitates authentication and management of a plurality of authentication applications 110. The device authentication service 130 is preferably hosted in a cloud distributed computing environment, but may alternatively be hosted in any suitable manner. The device authentication service 130 is preferably a multi-factor authentication service. In a preferred implementation, the device authentication service 130 functions as a web service to facilitate adding a second factor of authentication to an existing authentication system within an outside platform. For example, a website that enables user accounts to login with a username and password can integrate with the device authentication service 130 to simply add a second factor of authentication. The device authentication service 130 is preferably a remote cloud hosted system. The device authentication service 130 is preferably a multi-tenant application in that multiple users are configured to use the service for verifying at least the second factor of authentication.

The service can further be multi-tenant in that multiple outside services and platforms can use the service to augment their login system. For example, web platform A can use the device authentication service 130 for a set of their user accounts, while web service B can similarly share the use of the device authentication service 130 to provide 2FA for all of their user accounts.

The device authentication service 130 preferably includes an account database that associates accounts with devices/applications used as the second factor of authentication. The records of the account database preferably include parameters that can be used to communicate with the device. The communication parameters can include a phone number, push notification identifier, or any suitable addressable identifier.

The device authentication service 130 can additionally include biometric data records and credential records. The biometric data records are a set of biometric profiles for different users. Each user preferably includes at least one record of associated biometric profile data. A user can additionally include multiple biometric profiles. The credential records preferably store credentials for a plurality of users.

The device authentication service 130 can additionally include a biometric profile comparison module. The biometric profile comparison module functions to compare a stored biometric profile to a new biometric profile. The comparison module outputs a result that indicates if the biometric profiles correspond. The criteria for correspondence can include a match percentage, a likelihood of matching, or any suitable measure of how the profiles match. Depending on the information used in the biometric profile, an exact match may or may not be expected.

A credential record is a backup of the credentials stored by the authentication application 110. The credential records can additionally be cryptographically encrypted copies of credentials stored on an application instance of the user. The credentials can include any tokens, certificates, keys, or other components that an authentication application 110 uses when facilitating the authentication process.

Figure 3:
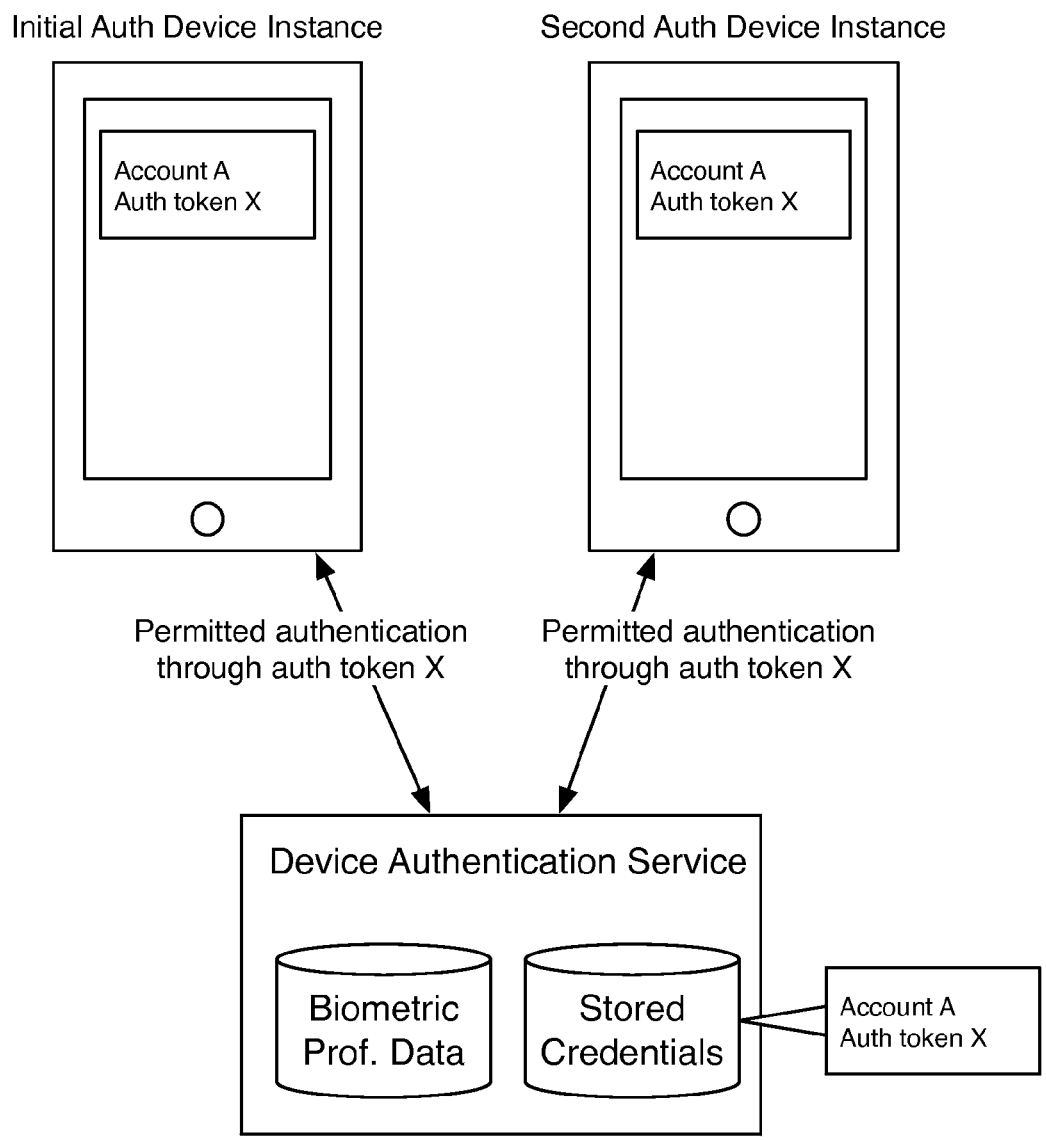
FIGS. 3-5 are schematic representation of variations on setting authentication credentials of a second authentication instance.
Figure 4:
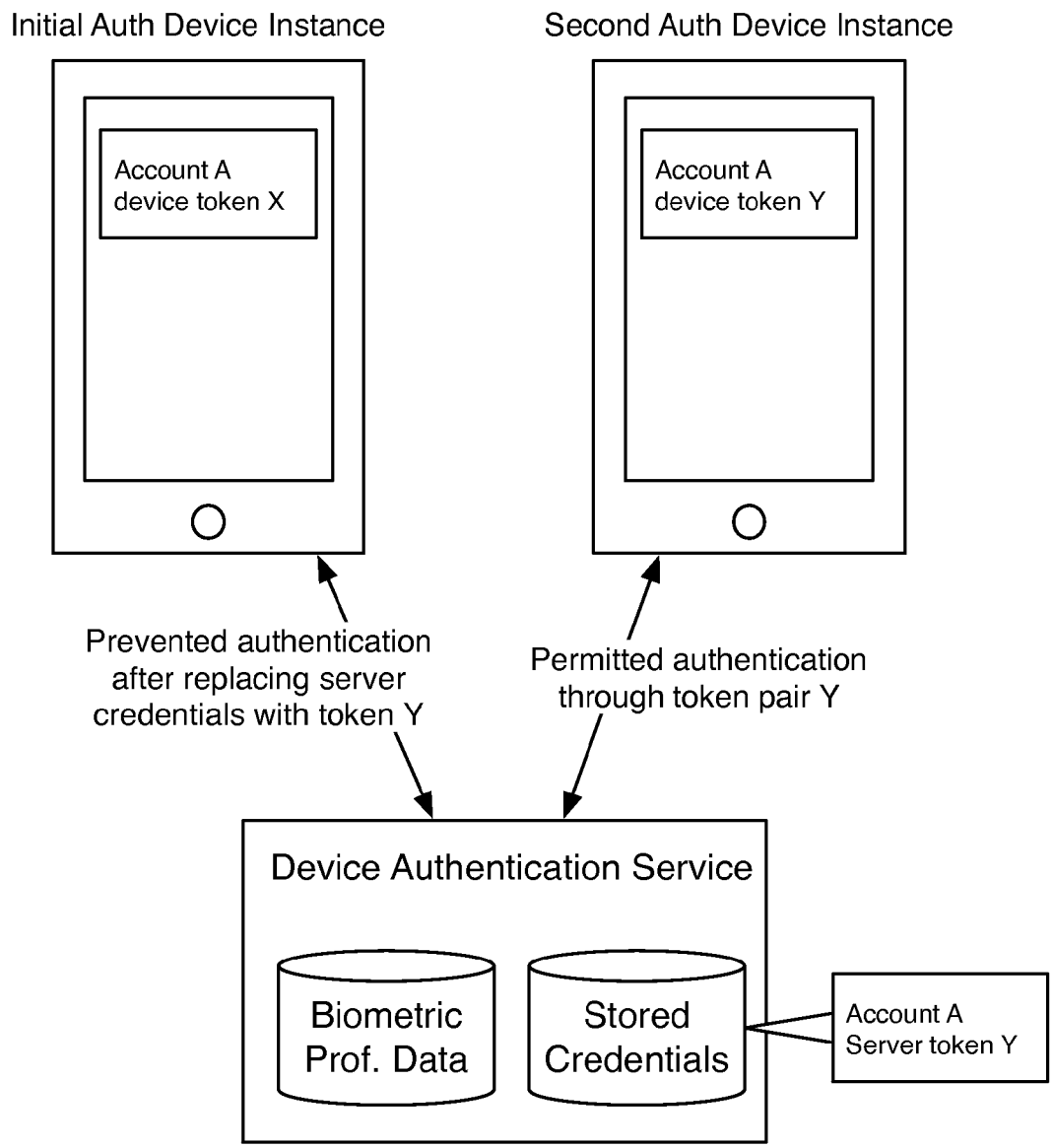
Figure 5:
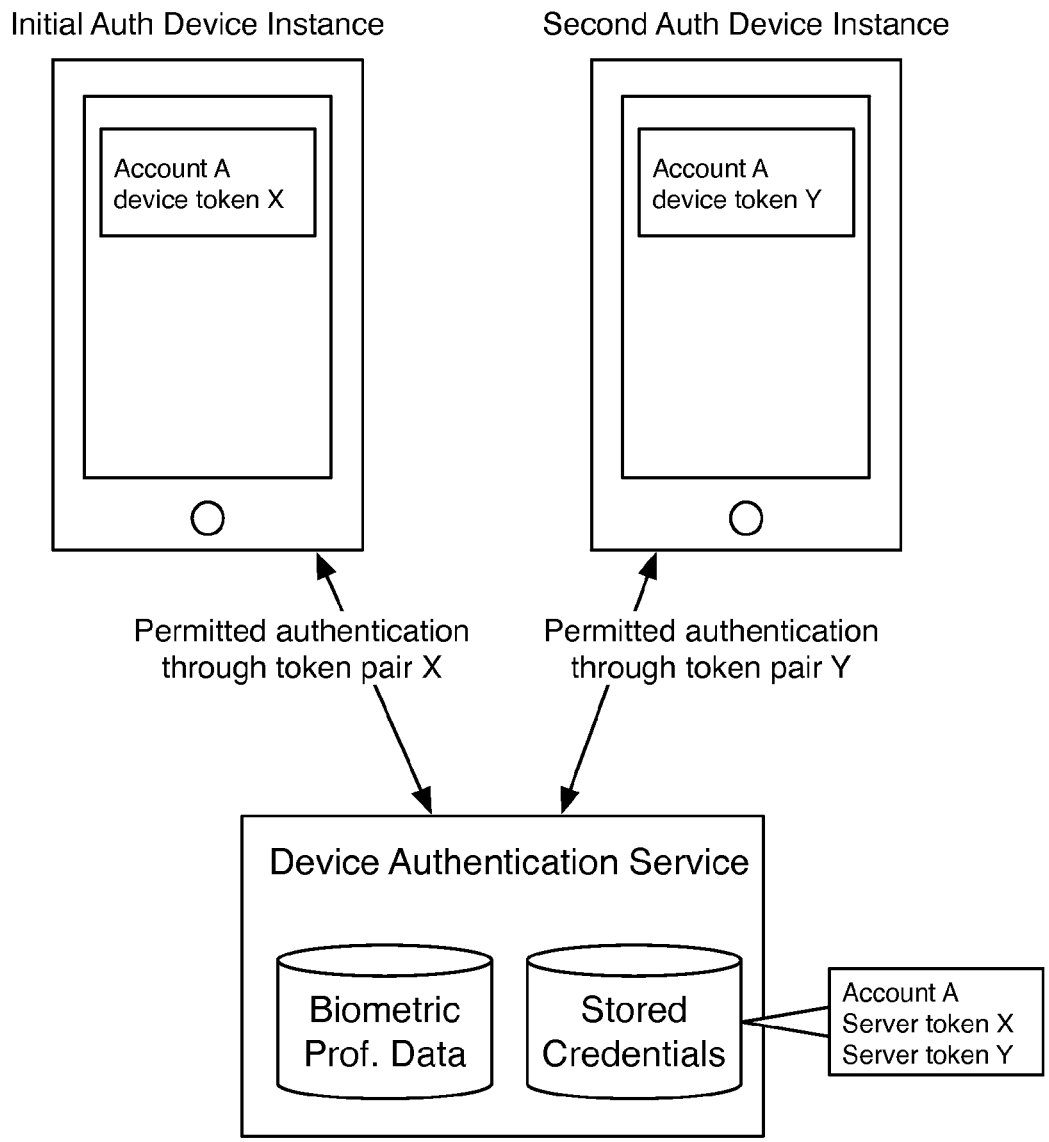

Various authentication credentials can be stored so that authentication can be verified with the authentication application 110. The device authentication service 130 preferably stores and/or manages credentials used in completing authentication with the 2FA. Authentication credentials such as shared secrets, some portion of a public/private key pair, tokens, OTP encryption key, or any suitable authentication credential used in verifying authentication confirmation of an authentication application 110 can be stored by the device authentication service 130. In some cases, the authentication credentials stored in the device authentication service 130 may include the tokens installed on the authentication application 110. In this case, a new authentication application 110 instance can be set up after confirmation of a biometric profile by transmitting the stored authentication credentials to the new authentication application 110 as shown in FIG. 3. In another variation, the authentication credentials correspond to the server side version of the cryptographic credentials stored on the authentication application 110. When setting up a new authentication application 110 (after confirming matching biometric profiles), the authentication credentials can be updated in the device authentication service 130 and synchronized with the new authentication application 110 instance, invalidating use of the previous authentication application 110 instance as shown in FIG. 4. In yet another variation, setting up a new authentication application 110 instance can set up a second set of authentication credentials such that both instances are kept operational as authentication devices as shown in FIG. 5.

The device authentication service 130 can additionally include a biometric profile comparison module. The biometric profile comparison module functions to as a biometric profile comparison module compares a stored reference biometric profile to a new biometric reference profile. The comparison module outputs a result that indicates if the profiles correspond. The criteria for correspondence can include a match percentage or a likelihood of matching. In one variation, an administrator (e.g., a developer in a multitenant platform) using the device authentication service 130 may specify a policy for the matching. The policy may specify a threshold for a match. The policy may specify define a set of conditions that depend on multiple biometric profile vectors. The policy may additionally set different profiling levels for a type of request, account or other set of interactions. A profiling level can alter what type of second biometric profile is collected and/or used as described below. An outside service may alternatively be used in facilitating the comparison of biometric signatures and/or data.

The device authentication service 130 can additionally include an application programming interface (API) or an alternative suitable integration mechanism such as a software development kit (SDK), libraries, and/or other suitable interface tool. The API can function to allow outside applications and services to interface and use the device authentication service 130 in combination with an internal authentication process. For example, an outside web platform may use an internal account username and password authentication process but make it dependent on successful completion of multi-factor authentication facilitated by the device authentication service 130. The outside web platform can use the API to communicate and integrate with the device authentication service 130. Alternatively, the device authentication service 130 can exist as a sub-system of a larger system such as a social network platform or an enterprise platform.

2. Method for Verifying Status of an Authentication Device

Figure 6:
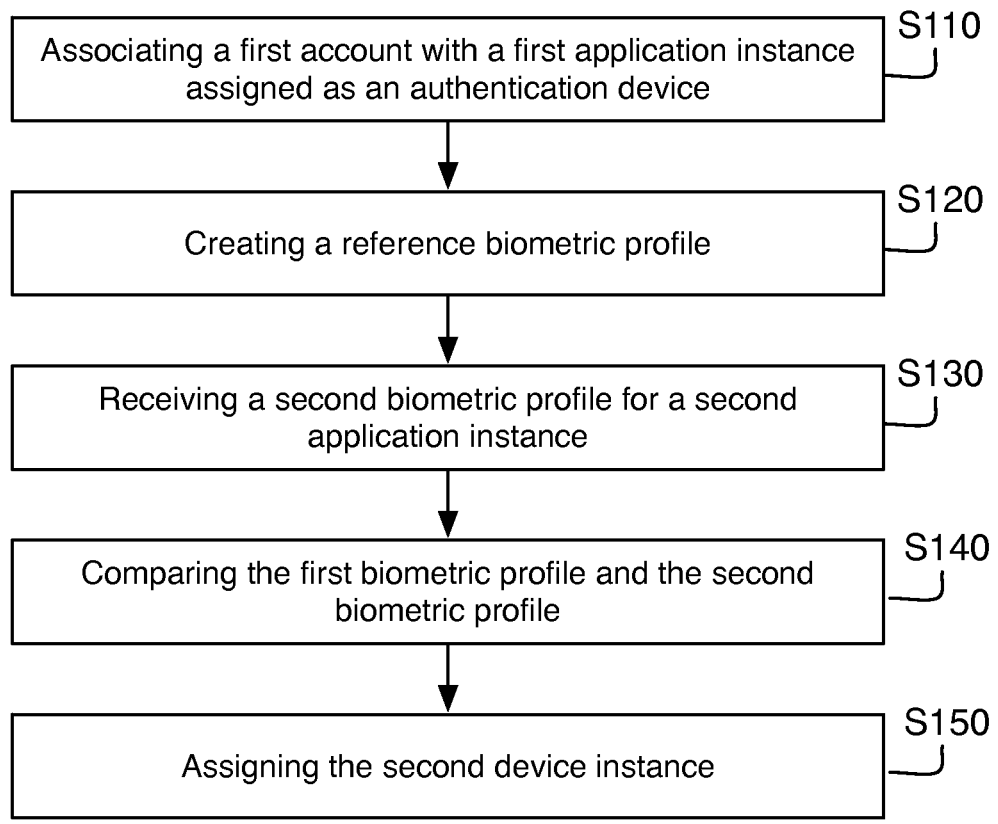
FIG. 6 is a flow diagram of a method of a preferred embodiment for assigning a second application instance.
Figure 7:
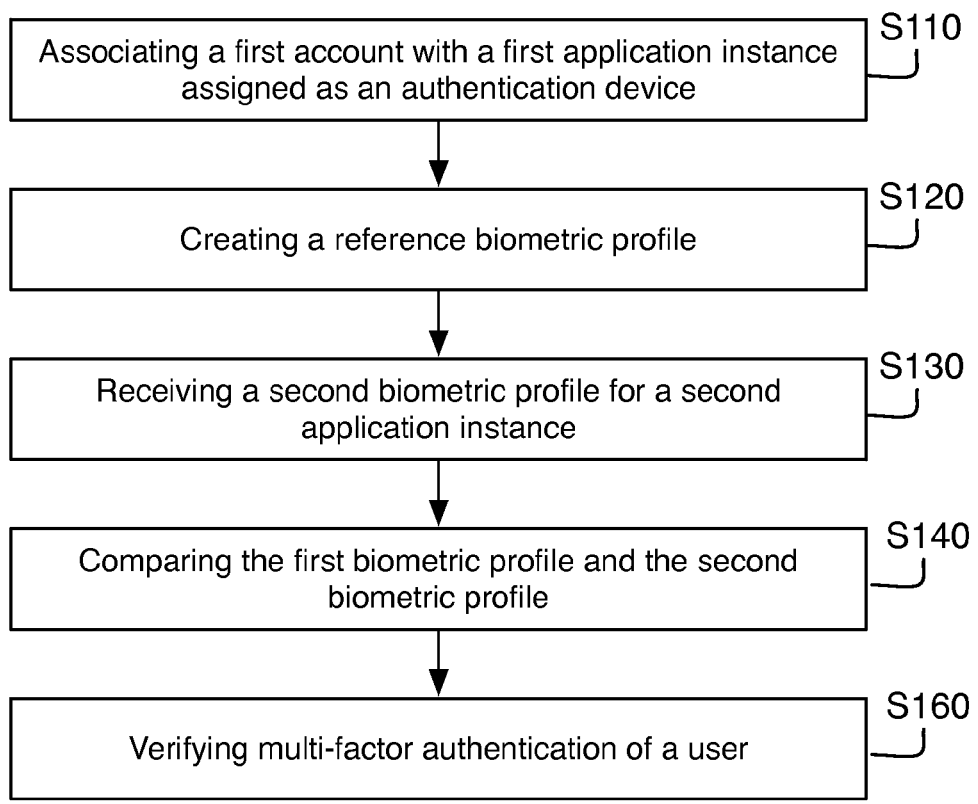
FIG. 7 is a flow diagram of a method of a preferred embodiment for authenticating a second application instance.
Figure 8:
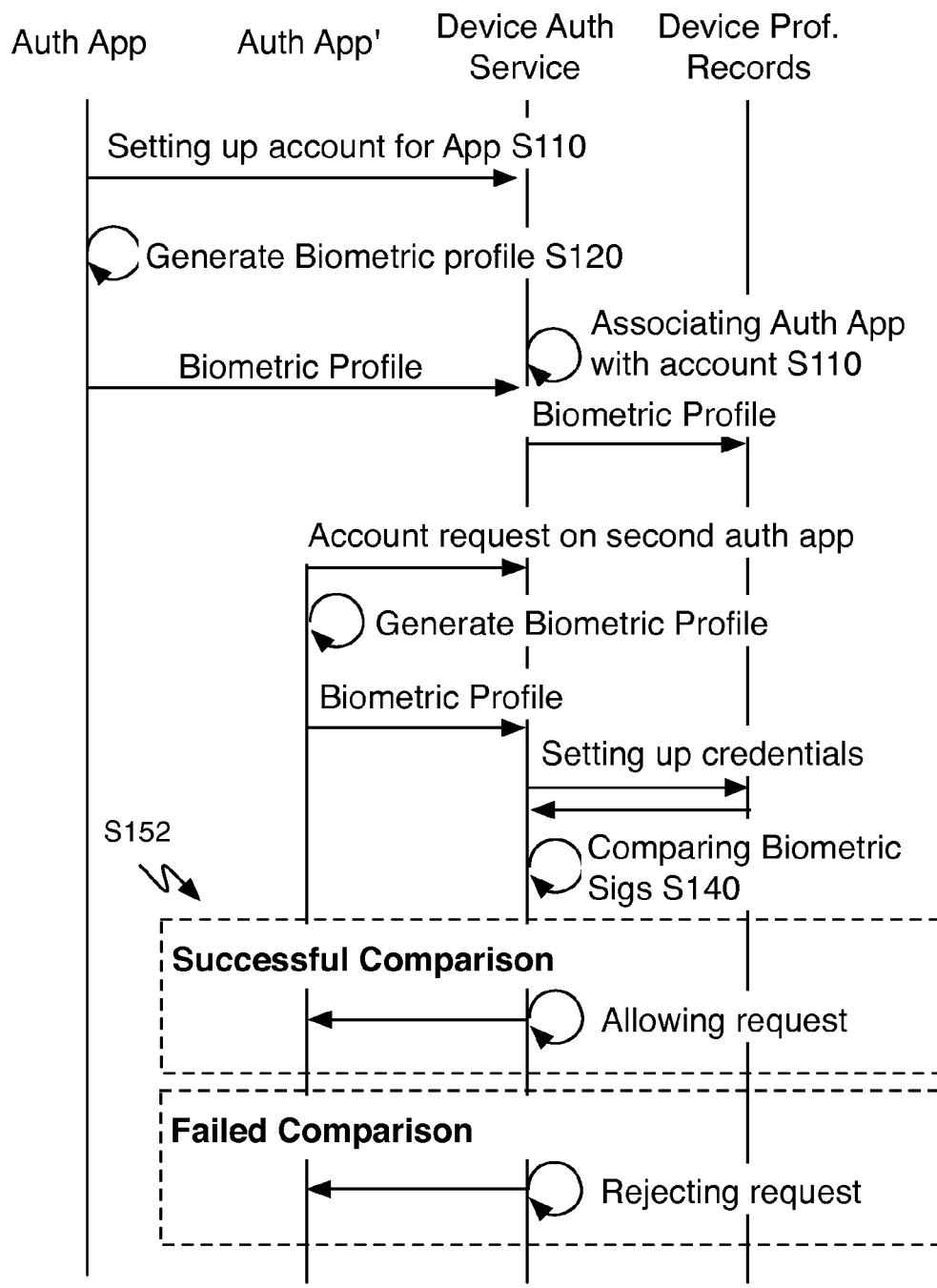
FIG. 8 is a communication flow diagram representation of a method of a preferred embodiment.

As shown in FIG. 6, a method for verifying status of an authentication device of a preferred embodiment includes associating a first account with a first application instance assigned as an authentication device S110, creating a reference biometric profile of the account S120, receiving a second biometric profile for a second application instance S130, comparing the first biometric profile and the second biometric profile S140, and assigning the second application instance as an authentication device of the first account S150. An alternative embodiment can include verifying multi-factor authentication of a user S160 as shown in FIG. 7. The method can function to add automated checks when switching, recovering, adding, or even authenticating an authentication device as shown in FIG. 8. Incorporating an additional factor of authentication (i.e., the biometric profile) can simplify the process of adding devices as two factor authentication devices. This can be beneficial in numerous scenarios.

In one scenario, a user may lose their phone, change phones, or accidentally uninstall the authentication application. The method enables the biometric profile of a user to simplify the recovery process when re-enrolling a new device or application instance. The method is preferably implemented by a 2FA system that facilitates 2FA authentication for multiple users. The 2FA is preferably a web-based service as described above. The method is preferably implemented by the system described above, but any suitable system can alternatively be used.

The ability to add or change an authentication device can be a security weakness in other authentication systems—an attacker may simply change the authentication device to his device. An authentication system may put several roadblocks, such as administrator approval and/or extra security checks, but the method of the preferred embodiment enables the change or update to an authentication application to be confidently updated with a biometric profile verification layer of protection. When applied to verifying updating of an authentication device instance, the method can include the initial set up of authentication credentials and then the establishment of authentication credentials with a second authentication device instance if the biometric profile comparison is confirmed to be successful (i.e., satisfy a condition of the biometric profiles matching), which functions to facilitate enrollment of a new authentication device instance.

Figure 9:
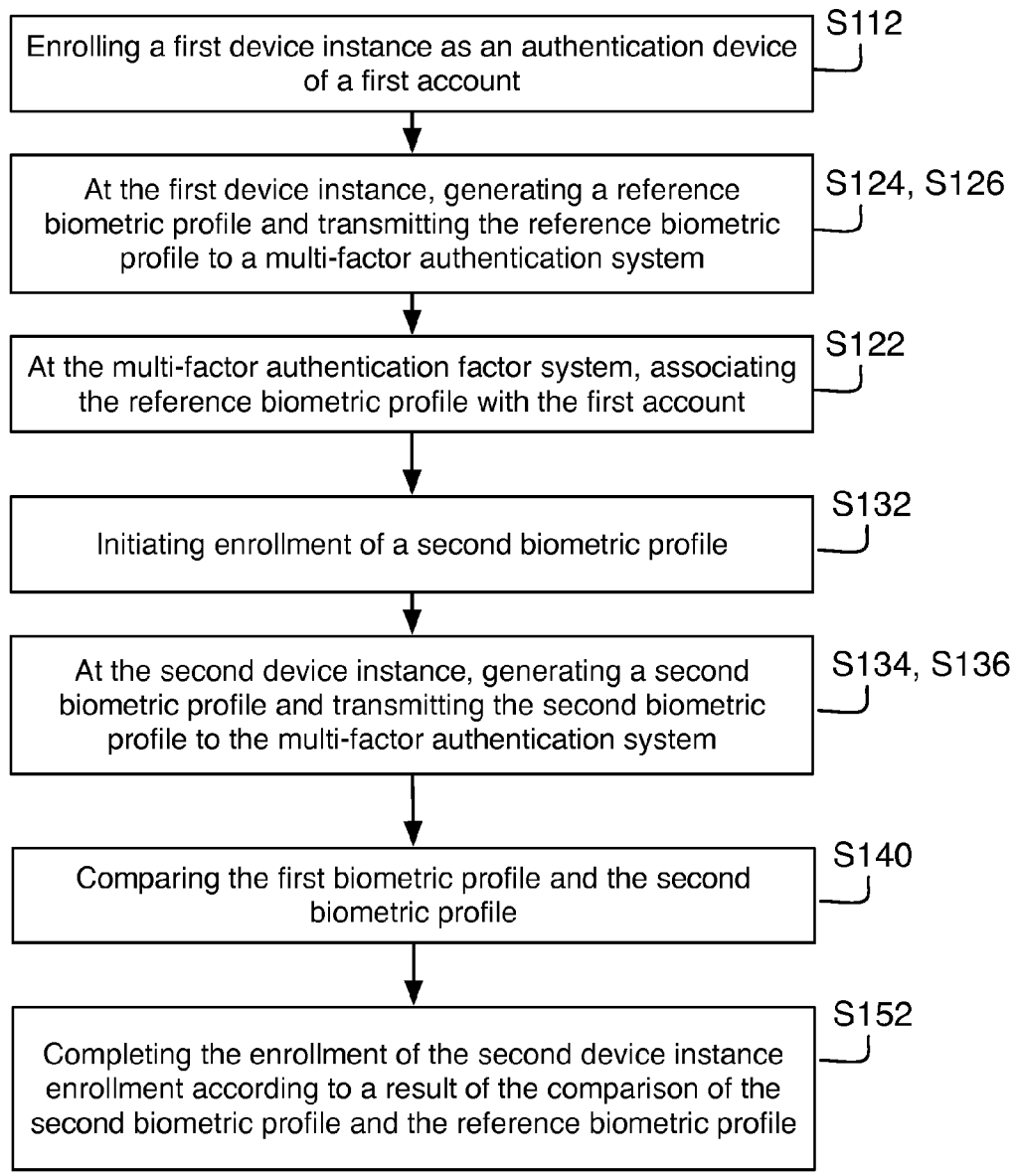
FIG. 9 is a flow diagram of a method of a preferred embodiment for enrolling a second application instance.
Figure 10A:
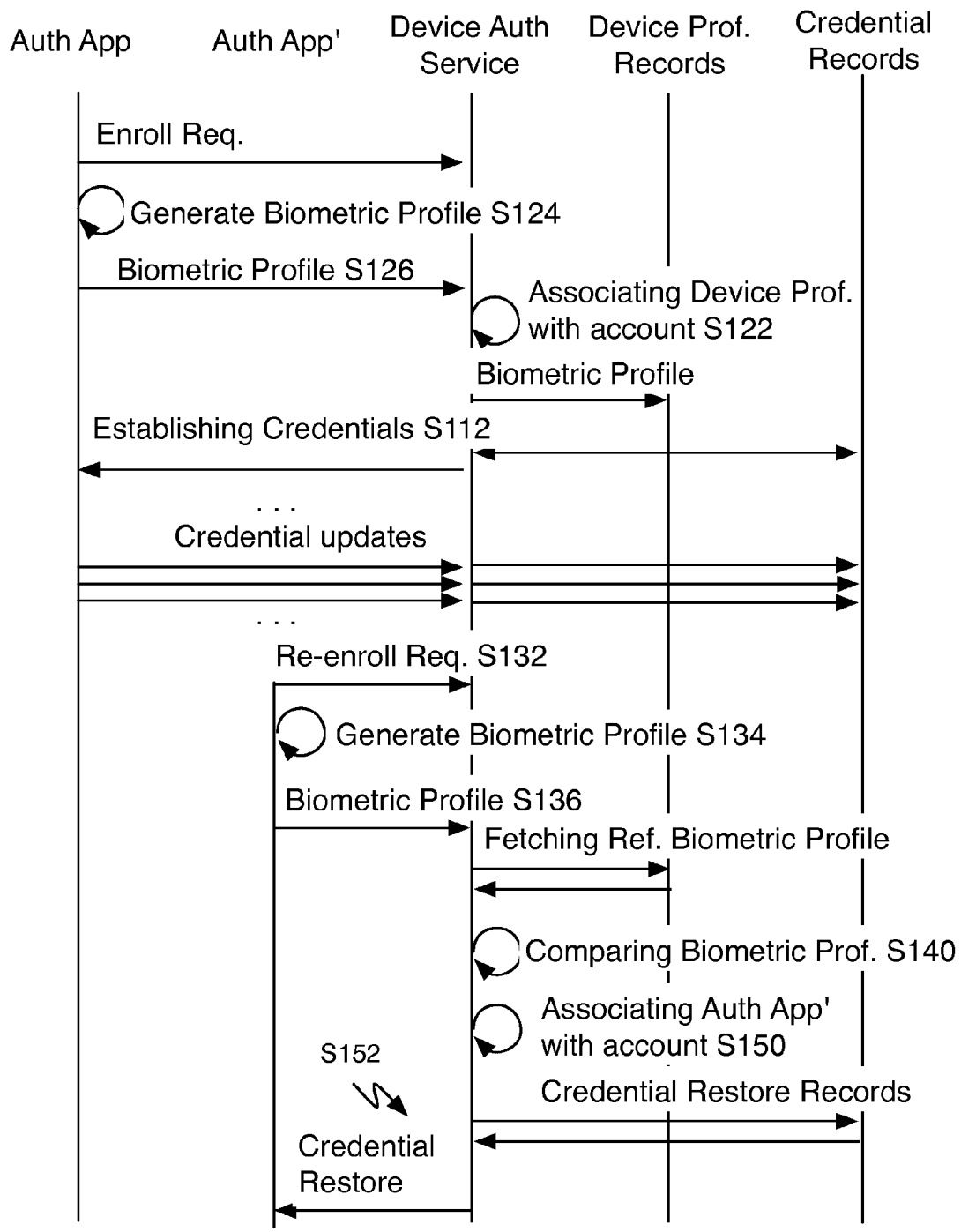
FIG. 10A is a communication flow diagram of a method of a preferred embodiment for enrolling a second application instance.
Figure 10B:
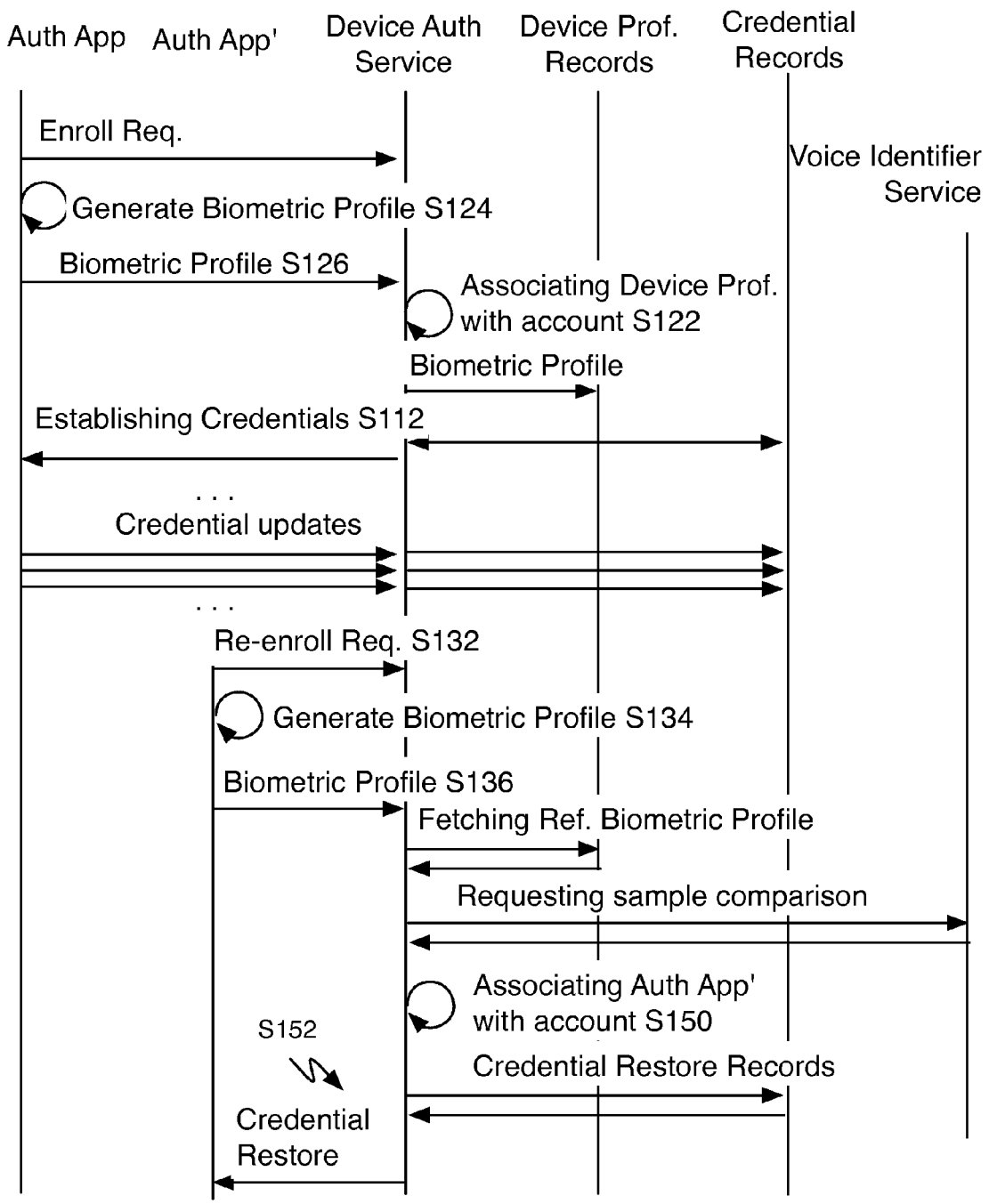
FIG. 10B is a communication flow diagram of a variation of a method for enrolling a second application instance using an outside biometric comparison service.

As shown in FIG. 9, one variation of a preferred embodiment for enrolling a second authentication device can include enrolling a first device instance as an authentication device of a first account S112; at the first device instance, collecting a reference biometric profile S124 and transmitting the reference biometric profile to a multi-factor authentication system S126; at the multi-factor authentication factor system, associating the reference biometric profile with the first account S126; initiating enrollment of a second device instance S132; at the second device instance, collecting a second biometric profile S134 and transmitting the second biometric profile to the multi-factor authentication system S136; comparing the reference biometric profile and the second biometric profile S140, and completing the enrollment of the second device instance enrollment according to a result of the comparison of the second biometric profile and the reference biometric profile S152. As shown in FIGS. 10A and 10B, credentials may be synchronized, reset, or otherwise established for a second authentication application.

Alternatively, the method may be used to for authentication credential recovery for primary authentication credentials or any suitable tokens or credentials, not just for multi-authentication use cases. For example, credentials setup for the primary authentication of an application (e.g., as in a mobile-first application), can be reestablished through the method. In one variation, a user may not be required to provide account username and password for an application that was previously setup. The biometric profiling approach of the system and method can be used to validate the user and/or device match and that credentials can be restored.

Block S110, which includes associating a first account with a first application instance assigned as an authentication device, functions to establish a device as a factor of authentication. The device is preferably used as the possession factor of authentication within a 2FA system, but can be used in any suitable manner within an authentication system. The device is preferably associated with an account during the user account configuration process.

Figure 12:
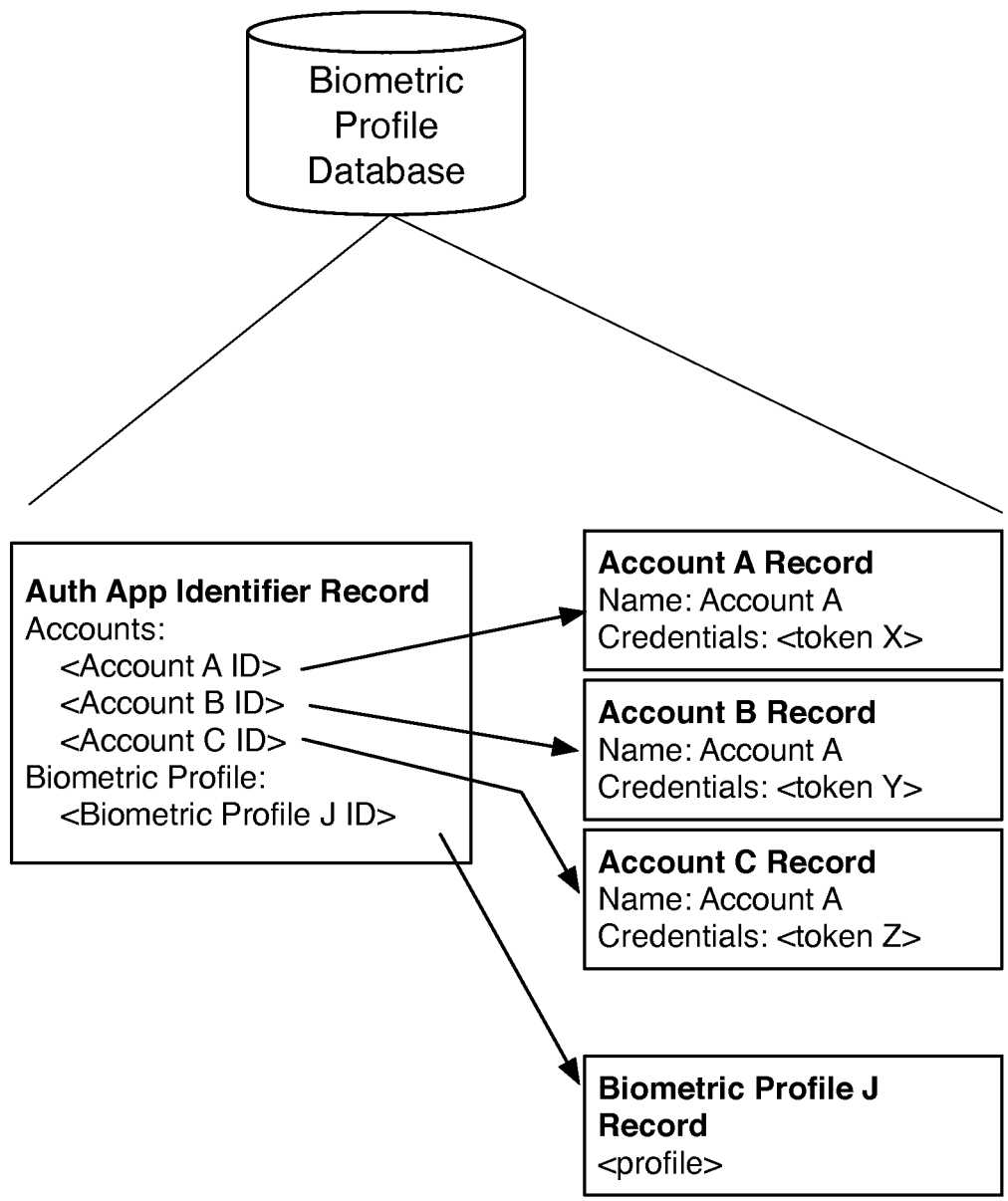
FIG. 12 is a schematic representation of an exemplary biometric profile mapping.

Associating a first account with a first application instance can include enrolling a first device instance as an authentication device of a first account S112, which may include receiving a device enrollment request, processing the request, and establishing the device as an authentication device. As described below, enrollment additionally includes associating a biometric profile with an account. The association of a biometric profile with a first account creates some stored mapping between one or more accounts of an authentication device as shown in FIG. 12. In one variation, the mapping is from an account to a biometric profile. If an enrollment request or authentication request is received for a particular account, a corresponding biometric profile can be identified. In another variation, the mapping is from a particular authentication device identifier and a biometric profile. The authentication device identifier may additionally be associated with a set of accounts (such that the biometric profile and the first account are associated through the authentication application identifier). An authentication identifier may be a unique token, but may alternatively be an endpoint identifier such as a telephone number, or other suitable endpoint.

When a user signs up for a 2FA system, the user will often be prompted to provide user credential information such as a username and password as well as configure a device for authentication. Configuring a device for authentication can involve downloading a special authentication application or configuring a device instance for use as an authentication device. In one variation, a user-installed authentication application is used. In another variation, the operating system of a device provides an authentication service layer to be used with the device. In one implementation, an application on a mobile device is used by a 2FA system to push authentication requests as the second factor of authentication. Thus, during enrollment, the 2FA associates the installed application instance with the corresponding account so that push notifications can be delivered to the correct application.

Additionally, authentication credentials, tokens, certificates, or other security-based items can be generated or delivered for local storage on the authentication device. Associating a first account can include establishing a set of authentication credentials on the first device instance and storing a corresponding set of authentication credentials in the multi-factor authentication system. In one variation, the authentication credentials are shared and the remote device authentication system will store the same set of credentials stored on the first device instance. In a second variation, the authentication credentials are asymmetric and the credentials stored in the remote device authentication system will correspond to the credentials stored on the first device instance. For example, a private key stored on the first device instance can correspond to the public key stored in the device authentication system.

In one variation, when the credentials are shared from the device to the device authentication system for remote storage, the credentials may be encrypted using a pin or password on the first device instance. And the encrypted authentication credentials are shared and stored in the device authentication system, which functions to remotely store the credentials but to prevent the device authentication system from inspecting or having access of the credentials, such as if the system was compromised. When the stored device credentials are shared with a second device instance, the second device instance collects a pin from a user and uses that pin to decrypt the encrypted credentials.

A single application can be used as an authentication application for multiple accounts of a user. In another variation, configuring a device may include providing the 2FA system with a phone number. To verify the device, a test message may be delivered with a code, which a user then confirms via another interface (e.g., a web form). The use of an authentication device through an outside communication channel can be an example of where the authentication application provides only biometric profiling services. For example, when 2FA codes are text messaged or called into a phone number, the authentication application is not the destination endpoint of 2FA authentication information. However, use of an authentication device can be used during initial enrollment and optionally in periodically updating biometric profiles. To facilitate collection of a biometric profile, an application (either native or web based) can be invoked specifically for the enrollment process. In one variation, the authentication application is installed on the authentication device instance, and the authentication application includes a user interface to guide a user through the appropriate steps for collecting and creating a biometric profile. In another variation, the application is invoked by a URI that is messaged to the phone number during enrollment. The URI can direct a user to the authentication application or to a site to install the authentication application. In addition to associating the application instance with an account, a biometric profile is additionally collected and associated with the account. The pairing of the biometric profile and the account functions to provide an additional authentication factor of the user device, which can be used during re-enrollment, elevated security authentication actions, routine authentication attempts, or other suitable scenarios. As mentioned above, a single application instance can be used for multiple accounts. If a biometric profile is already created for the application instance or stored in a device authentication service, then Block S120 may have previously been completed. The stored biometric profile can be used in place of collecting new biometric data in Block S120.

The reference biometric is preferably transmitted from an authentication application to a remote authentication device service. The biometric profile is preferably transmitted over HTTP, but the biometric profile can be transferred using any suitable protocol. The biometric profile preferably originates from an authentication application that generated the biometric profile. In an alternative implementation, the raw biometric data is transferred to the device authentication service, and the device authentication service processes the information into a biometric profile. In yet another variation, a hybrid approach includes partially forming the biometric profile on the authentication application and partially forming the biometric profile at the device authentication service. The method can additionally include creating a reference biometric profile S120.

Block S120, which includes creating a reference biometric profile, functions to collect a biometric sample or samples from a user associated with the account and authentication application. The biometric profile is a collected parameterization of any suitable physically identifying characteristic of a user, such as speech sampling, finger print scanning, palm scanning, retina scanning, iris scanning, facial recognition, tongue scanner, hair growth patterns (e.g., on the arm), capillary patterns (e.g., measured by illuminating the skin in contact with a camera), and/or other suitable forms of biometric based approaches. Creating a biometric profile includes collecting at least one biometric sample, and can optionally include processing the biometric sample into a biometric characterization object.

Creating a reference biometric profile preferably includes generating a reference biometric profile S124; transmitting the reference biometric profile to a multi-factor authentication system S126; and at the multi-factor authentication factor system, associating the reference biometric profile with the first account S126. The authentication application installed in the device instance will preferably collect various biometric data from a user. That information can be formed into some biometric signature data object. The biometric profile can be a structured/readable and/or cryptographic representation of one or more biometric-based information signals. The raw biometric measurements may be included in the biometric profile. Additionally or alternatively, processed biometric characterizations can be included in the biometric profile as a biometric signature.

In a preferred implementation, the biometric profile is speech based as shown in FIG. 10B. A speech profile can include collecting at least one speech recording of a user. The user is preferably prompted to read a set of phrases. The phrases can be randomly generated (i.e., text-independent) to capture various speech patterns characteristic of an individual user. The phrase prompts are preferably displayed through the authentication application. The reference samples collected from the samples can preferably be used to determine if a subsequent phrase (e.g., the second biometric profile data of Block S130) was spoken by the same person. The changing phrases can also avoid a playback attack with the second biometric profile data. The speech profile can alternatively be text dependent phrases where the phrase adds a knowledge element to the speech profile. For example, the speech recording may be an audio recording of a pass phrase. The initial speech samples may be larger sample size compared to subsequent speech profiles. The speech sample is preferably stored at the device authentication service, but can alternatively be stored on the authentication application or directly processed into a speech/voice characterization signature. Processing of the speech sample is performed at a speaker verification engine. The speaker verification engine can use any suitable approach to generate a speech/speaker signature. The speech profile is preferably a storable data object that characterizes speech patterns that can be used in subsequent verification processes. In another variation, the speaker verification engine compares two samples and determines if the speaker is the same. The speaker verification engine can be incorporated within the authentication application, the device authentication service, or into an outside service.

In another preferred implementation, the biometric profile is fingerprint based. A fingerprint reader is preferably a component of the device or communicatively coupled to the device. The user is prompted to scan a finger and a fingerprint profile is generated to reflect the identifying patterns of the fingerprint. The biometric profile can be generated wholly on the authentication application. The biometric profile could alternatively be collected and processed outside of the authentication application in part or whole. In one variation, the authentication application is used to collect the biometric samples, and the biometric samples are transmitted to the device authentication service where the samples are stored. When biometric authentication is required, the new biometric sample and the reference biometric sample are sent to an outside service to process the samples and determine if the user identity is consistent between the two samples. In another variation, the biometric samples are processed into a biometric characterization signature and resulting characterization signatures are compared.

As described above, the method can include establishing a knowledge-based factor of authentication, which functions to serve as a pin code used in combination with the biometric profile. The knowledge-based factor can accompany the biometric profile to supplement verification of the biometric profile. The pin code could be inputted text or pin number, but could alternatively be a particular phrase the user says during the speech sample collection.

The method can additionally include collecting multiple biometric data and using the combination of biometric data as a biometric profile. For example, pulse, blood pressure, and body temperature may not individually be unique, but in combination with the time of day may provide a substantially identifying metric.

The registered biometric profiles may be periodically updated over time. Trends in how the registered biometric changes can additionally be used as a signal used in a reference biometric profile. As in the use of a combination of metrics like pulse and blood pressure, these biometric data points may be a function of time of day, and so recording the history of these over time may provide a more informed reference biometric profile.

The method can additionally include periodically updating credentials of the authentication application, which functions to maintain the authentication capabilities of an application instance. The credentials can include settings, tokens, account information, or other data that an authentication application maintains to facilitate 2FA. A copy of the credentials can be stored on the remote device authentication service. As mentioned, some variations may include an authentication application that is used to manage the device-based factor of authentication for a number of different accounts. For example, a user may have 2FA configured on an authentication application for a personal email account, a work email account, and a work VPN account. Authentication credentials for multiple accounts can be stored locally on the application and backed up on a remote device authentication service. The authentication credentials are preferably transmitted from the application to the device authentication service, and the device authentication service stores the credentials. The credentials can optionally be cryptographically encrypted by the authentication application or the device authentication service before storing an encrypted copy. An authentication application will preferably be initially set up with one or more authentication credentials. Over time these credentials may change for the one or more accounts. Additionally, the user may add or remove accounts that authenticate with the authentication application, and so authentication credentials may be added or removed.

Block S130, which includes receiving a second biometric profile for a second application instance, functions to have a different biometric profile transmitted from the authentication application. The biometric profile is preferably created and collected in substantially the same way as the initial reference biometric profile of Block S120 wherein receiving a second biometric profile can include collecting a second biometric profile S134 and transmitting the second biometric profile to the multi-factor authentication system S136. In the variation where the biometric profile is speech based, a random phrase is preferably generated at the authentication application, the user is recorded repeating the phrase, and a speech profile is generated from that phrase. If multiple forms of biometric profiles were collected as reference biometric profiles, one or more of the types of biometric profiles may be used to as the second biometric profile. Additionally, the second biometric profile can be accompanied by a knowledge-based factor of authentication. For example, a pin code or pass phrase can be submitted embedded within the biometric profile data.

Figure 13:
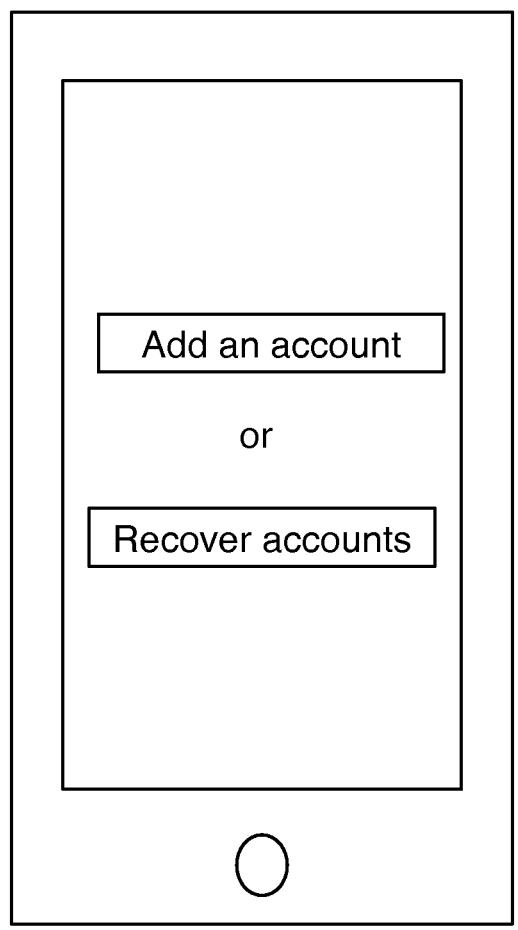
FIG. 13 is an exemplary interface screenshot of an initial re-enrollment flow.

Receiving a second biometric profile is preferably in response to or subsequent to initiating enrollment of a second device instance S132, wherein a different device instance wants to replace the previous device instance or to be an option in addition to the first device instance. Receiving the re-enrollment request functions to initiate a process of confirming that a device or application used as a factor of authentication can be changed. The re-enrollment request will often be received at a time removed from the initial steps of enrolling the first application instance and the reference biometric profile. Re-enrollment is preferably a user-initiated action within the device authentication service, and the action is often initiated when the association between an account and the corresponding authentication device has been broken. The association can be broken if the authentication application configuration data is deleted, reset, or at least partially cleared; if the physical device is lost and a new device is used; if a user wants to change devices; if the user wants to add a second device; or for any suitable reason. A new device can often require a new application instance to be installed. If a backed up application instance was installed, the authentication credentials may be backed up as well, but because of the device change, the credentials can require updating or verification before use. A second device could be added when a user desires to have two or more devices used in parallel with an authentication service wherein either of the enrolled devices can be used interchangeably to authenticate a request. The user will preferably use an account setting page to request re-enrollment of a device. For example, when logging into a site, there may be a link for re-enrollment. In another variation shown in FIG. 13, a user can have the option of re-enrolling presented when accessing an authentication application. Upon user selection of this option in the authentication application, the authentication application proceeds to collect a second biometric sample and communicate with the device authentication service to determine if re-enrollment will be permitted.

The first and second device instances can be the same type of authentication application, new versions of the same type of authentication application, or different authentication applications (e.g., when changing operating systems). The first and second device instances can be on the same physical device or may be on different physical devices.

In one variation, a reference biometric profile will include various biometric metrics that can be used in matching a biometric profile. Only a subset of the metrics may be used in the second device profile. In some cases, the method can include detecting a profiling level of a request, and then selectively generating the second profile to fulfill the profiling level of the request. The profiling level can define the types and thoroughness of the biometric metric collection. The profiling level may be set based on some policy on what types of biometric profiling requirements need to be met for certain actions. At a basic level, the second biometric profile from the second device instance can collect a basic fingerprint. One exemplary heightened profiling level may be used for requests that need more assurance of a match between the device profiles. A heightened profiling level may depend on fingerprint metrics and a speaker recognition metric. Any suitable set of biometric profiling levels may be set and applied depending on policy.

Alternatively, Block S130 is preferably performed in response to or subsequent to receiving an authentication request of a device S134, which functions to use a biometric profile comparison as an additional factor of authentication. The biometric profile comparison can supplement the authentication criteria for normal logins and/or be used in special login requests such as for actions with higher security or privacy restrictions. The biometric profile comparison can additionally be used upon encountering an error or an event, which triggers a flag, such as multiple login attempts, suspicious login patterns, or other events that would prompt the increase in security.

Block S140, which includes comparing the first biometric profile and the second biometric profile, functions to verify that the speaker identity matches in the first and second biometric profiles. In a preferred embodiment, the speech samples are collected and stored reference speech samples for an account. The second biometric profile is collected in a second set of speech samples that were recorded after receiving the re-enrollment request. The reference speech samples and the newly recorded speech samples are transmitted to a speech verification service. The speech verification service can be an outside network accessible service or alternatively, a locally hosted speech verification service. The speech verification service responds, indicating if the speaker in the two sets of samples is the same speaker. In alternative embodiments, the biometric samples are processed into signatures to be compared and matched. As the biometric samples and the resulting biometric profiles may not have an exact match, a similarity threshold can be used to determine the degree of similarity required to indicate a match. Such a threshold is preferably dependent on the type of biometric profile.

In response to comparing the first and second biometric profiles, the method can perform several optional actions. In a preferred embodiment, the method is used in re-establishing the relationship between an account and a second form of authentication (e.g., the user device or an authentication application instance), in which case the method can include assigning the second application instance if the first and second biometric profiles satisfy a matching criteria S150. In an alternative embodiment, the method is used in confirming multi-factor authentication of an account supplementing the multi-factor authentication process, in which case the method can include verifying multi-factor authentication of a user if the first and second biometric profiles satisfy a matching criteria S160. If the second biometric profile does not satisfy a comparison condition, then the interaction with the second device instance is preferably canceled, stopped, flagged for additional confirmation, or responded to in a suitable manner. If the second biometric profile doesn't match the biometric profile on record, that may signal that someone is attempting to maliciously change an enrolled device, impersonate the enrolled device, or perform other illicit behavior.

The method preferably acts on the comparison by completing a request of the second application instance according to results of comparing the second biometric profile and the first biometric profile, which functions to selectively act on a request based on success or failure of the biometric profile comparison. Preferably, completing a request includes assigning the second device instance S150. The method may additionally or alternatively include verifying multi-factor authentication of a user S160. The request may be an enrollment request. The request may alternatively be an authentication request.

Block S150, which includes assigning the second device instance, functions to update records to associate an account with a new application instance. The device used for 2FA can be updated or reset to a new device/application. In a similar variation, an additional application or device can be added and used in parallel to an existing 2FA device/application. Assigning a new application instance can include completing the enrollment of the second device instance enrollment according to a result of the comparison of the second biometric profile and the reference biometric profile S152. Completing enrollment can include updating database records of an account within the device authentication service. Additionally, assigning a new application instance can include transferring stored credentials of the account to the application instance. In this way, re-enrolling can re-establish all accounts managed by the device authentication service. In an alternative variation, a new set of credentials is created for the second device instance. The new set of credentials preferably adds a second optional set of authentication credentials for registered accounts (i.e., for a set of the services used with an authentication application). The new credentials may alternatively replace the existing credentials stored in the device authentication system, which invalidates use of the first device instance. In both variations, a new application instance can restore the 2FA credentials for the personal email account, the work email account, and the work VPN account through a single re-enrollment request. The second application instance is often a new instance of the authentication application. As mentioned, this can result from a change of a physical device and/or new installation of the authentication application. In a first variation, assigning the second application instance includes reassigning the association of an account with the first application instance to the second application instance. The prior association between the account and the first authentication application instance in the account record is removed and replaced with an association between the account and the second authentication application instance. In subsequent authentication attempts, the second authentication application will be used instead of the original authentication application. The second authentication application is preferably the same application. A new instance can include the same application installed on a new device, an updated version of the application, or an application with all or a portion of the credential data missing. The second authentication application can alternatively be a completely different application. For example, a user may want to transfer the 2FA capabilities for an email account previously handled in a general purpose 2FA application to an email account specific application. In a second variation, an association with the second application instance is added in addition to the previously established association with the first authentication application instance. This variation enables either one of the two active application instances to be used to complete a 2FA flow. A benefit of S150 is that it can automate the process of an administrator confirming the change of an authentication device. The method can additionally include transmitting an alert or requesting confirmation of an administrator.

Figure 11:
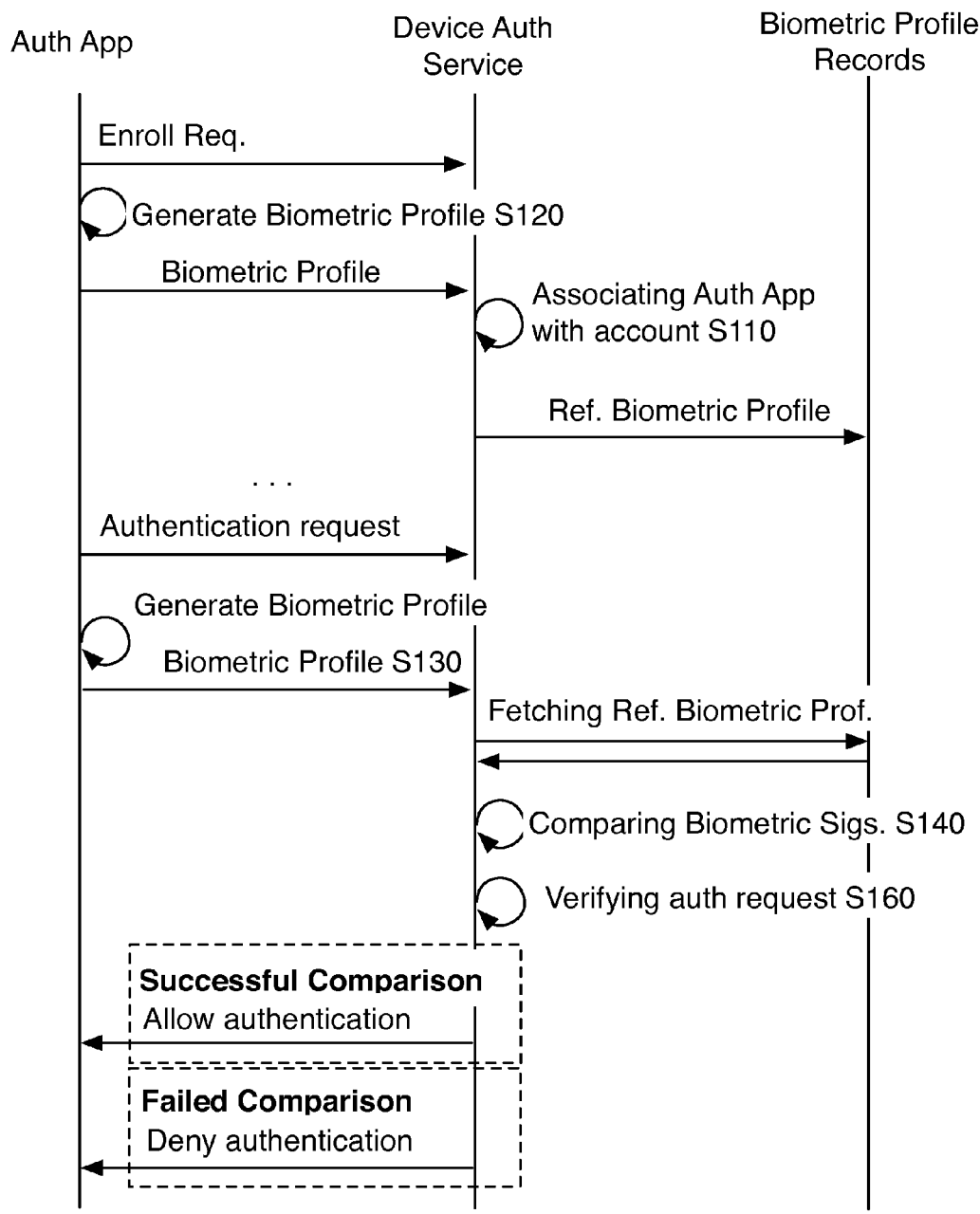
FIG. 11 is a communication flow diagram of a method of a preferred embodiment for authenticating an application instance.

An alternative embodiment can include verifying multi-factor authentication of a user S160, which functions to use the biometric profile comparison as criteria used in verifying an authentication request as shown in FIG. 11. The biometric profile form of authentication will preferably be used as a third form of authentication. Block S160 may be used in addition to S150 or in place of S150. For example, a user will provide a username and password to a website; that website will invoke the 2FA service to push an authentication notification to the authentication application of the corresponding account; the user will respond through the authentication application on their phone to confirm the login request; the user may be requested to provide biometric samples; and the 2FA service uses the user confirmation and the biometric samples comparison to confirm or deny the authentication request on the website. The biometric profile approach to authentication may be used in response to heightened permission requirements or a raised security flag. If a user makes several consecutive failed login attempts, the biometric samples can be collected to authenticate eventually-successful credentials or to allow/block further login attempts. Similarly, the biometric authentication approach can be used for actions that require increased security. For example, changing a password of an account could require biometric profile verification.

The system and method may additionally collect any additional authentication information to further add factors of authentication. For example a PIN provided by an end user may be used in conjunction with the system to improve security. The PIN and the device profile may need to be verified to complete credential restore or authentication.

If a second device instance is successfully enrolled or authenticated, the second biometric profile may be set as a new reference biometric profile for subsequent enrollment or authentication requests. Similarly, the second biometric profile may be incorporated into the reference biometric profile as an update to the reference biometric profile.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the authentication application and the device authentication service. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
    receiving a first biometric profile and associating the first biometric profile with a first account, wherein the first account is associated with a first application instance;
    establishing a first set of authentication credentials for a set of accounts on the first application instance;
    receiving a second biometric profile for a second application instance, wherein the second application instance is making a request on behalf of the first account;
    comparing the second biometric profile to the first biometric profile; and
    completing the request of the second application instance according to results of comparing the second biometric profile to the first biometric profile.

2. The method of claim 1, further comprising prompting a user of the first account to provide the second biometric profile in response to heightened permissions requirements.

3. The method of claim 2, wherein prompting a user of the first account to provide the second biometric profile in response to heightened permissions requirements comprises prompting the user to provide a non-zero number of distinct biometric signals; wherein the number of distinct biometric signals is set according to the heightened permissions requirements.

4. The method of claim 1, further comprising prompting a user of the first account to provide the second biometric profile in response to a security flag raised after several consecutive failed login attempts.

5. The method of claim 1, wherein receiving the first biometric profile comprises receiving at least two distinct biometric signals; wherein comparing the second biometric profile to the first biometric profile comprises comparing a biometric signal of the second biometric profile to only one biometric signal of the first biometric profile.

6. The method of claim 1, wherein receiving the first biometric profile comprises receiving at least two distinct biometric signals; wherein receiving the second biometric profile comprises receiving at least two distinct biometric signals; wherein comparing the second biometric profile to the first biometric profile comprises comparing biometric signals of the second biometric profile to at least two biometric signals of the first biometric profile.

7. A method comprising:
   receiving a first biometric profile and associating the first biometric profile with a first account, wherein the first account is associated with a first application instance;
   establishing a first set of authentication credentials for a set of accounts on the first application instance;
   initiating enrollment of a second device instance of the first account;
   receiving a second biometric profile at the second device instance;
   transmitting the second biometric profile to the multi-factor authentication system;
   comparing the second biometric profile to the first biometric profile; and
   completing the enrollment of the second device instance according to results of comparing the second biometric profile to the first biometric profile.

8. The method of claim 7, wherein completing the enrollment of the second device instance comprises, when the second biometric profile is confirmed to correspond to the first biometric profile, establishing a second set of authentication credentials for the set of accounts on the second device instance.

9. The method of claim 8, wherein the second set of credentials is a copy of the first set of credentials stored at the multi-factor authentication system.

10. The method of claim 8, further comprising updating the first set of credentials used by the first device instance at least one time after enrollment.

11. The method of claim 8, wherein completing the enrollment of the second device instance comprises invalidating the authentication credentials of the first device.

12. The method of claim 8, wherein completing the enrollment of the second device instance enrollment according to the result of the comparison of the second biometric profile and the reference biometric profile comprises, when the second biometric profile is confirmed to not correspond to the reference biometric profile, rejecting enrollment of the second device instance.

13. The method of claim 8, wherein the first device instance is a different physical device from the second device instance.

14. The method of claim 8, wherein the first device instance is a first application installation instance on a first physical device, and the second device instance is a second application installation instance on the first physical device.

15. The method of claim 7, wherein receiving the first biometric profile comprises receiving at least two distinct biometric signals; wherein comparing the second biometric profile to the first biometric profile comprises comparing a biometric signal of the second biometric profile to only one biometric signal of the first biometric profile.

16. The method of claim 7, wherein receiving the first biometric profile comprises receiving at least two distinct biometric signals; wherein receiving the second biometric profile comprises receiving at least two distinct biometric signals; wherein comparing the second biometric profile to the first biometric profile comprises comparing biometric signals of the second biometric profile to at least two biometric signals of the first biometric profile.

17. The method of claim 7, wherein receiving the first biometric profile comprises receiving at least two distinct biometric signals; further comprising prompting a user of the first account to provide a non-zero number of distinct biometric signals in the second biometric profile; wherein the number of distinct biometric signals is set according to permissions requirements.

\* \* \* \* \*